United States Patent [19]

Parks

[11] Patent Number: 5,143,326

[45] Date of Patent: Sep. 1, 1992

[54] VEHICLE AIR LIFT RIG

[75] Inventor: Jeffery S. Parks, Macomb, Mich.

[73] Assignee: The United States of America as represented by the Secretary of the Army, Washington, D.C.

[21] Appl. No.: 740,527

[22] Filed: Aug. 5, 1991

[51] Int. Cl.$^5$ .................... B64D 3/00; B66C 13/04
[52] U.S. Cl. ................ 244/137.4; 244/118.1; 294/81.1; 294/904
[58] Field of Search ............ 244/118.1, 137.4; 212/146; 294/81.1, 904

[56] References Cited

U.S. PATENT DOCUMENTS

| | | | |
|---|---|---|---|
| 2,987,340 | 6/1961 | Mattera | 294/904 X |
| 3,747,970 | 7/1973 | Fathauer et al. | 294/81.1 |
| 4,378,919 | 4/1983 | Smith | 244/137.4 X |
| 4,553,719 | 11/1985 | Ott | 244/118.1 |
| 4,913,480 | 4/1990 | Yohe | 244/137.4 X |

Primary Examiner—Charles A. Marmor
Assistant Examiner—Carla Mattix
Attorney, Agent, or Firm—Peter A. Taucher; David L. Kuhn

[57] ABSTRACT

The invention is a rig useful in preventing relative movement between two vehicles or other payloads suspended from a helicopter. The rig has two triangular plates which are in connection between the vehicles, the connection being loose before cables from the helicopter to the triangular plates are tensioned. When the helicopter rises, tension on the cables raises the triangular plates, thereby pivoting clevises which are engaged with the triangular plates and which are mounted on on the vehicles. The pivoting of the clevises draws the vehicles into tight abutment with abutment plates at the ends of the triangular plates so that the vehicles act as a single, more stable load. A cross member is connected both between the triangular plates and between the vehicles to inhibit relative lateral movement of the vehicles.

10 Claims, 3 Drawing Sheets

5,143,326

VEHICLE AIR LIFT RIG

GOVERNMENT USE

The invention described herein may be manufactured, used and licensed by or for the U.S. Government for governmental purposes without payment to me of any royalty thereon.

BACKGROUND

Frequently military forces air lift vehicles, palletized materiel, or other payloads by suspending the payloads from cables attached to the underside of a helicopter. Military vehicles are typically provided with clevises, hooks or eyes usable as attachment sites for cables from the helicopter. Often helicopters such as the US Army's CH47 are powerful enough to lift two vehicles such as Army HMMWVs (High Mobility Multipurpose Wheeled Vehicles) or two pallets. A serious problem with air lifting two separate payload items is that these items can swing on the cables independently of one another, whereby the aggregate payload is unstable. An unstable aggregate load increases the difficulty and danger of air lifting two separate payload items by one helicopter. Lifting more than one payload item is thus conventionally avoided.

SUMMARY OF THE INVENTION

My invention is an air lift rig connectable between two vehicles that are to be air lifted by helicopter. The rig includes two generally triangular fish plates connected to pivotable clevises mounted on the vehicles, the apexes of the fish plates having means to attach cables to the fish plates. Prior to air lift the components of the rig fit together loosely, whereby installation of the rig is faster and easier and whereby greater error in positioning the vehicles for air lift can be tolerated. Tensing the cables raises the fish plates and brings each plate into abutment with both vehicles so that the vehicles act as a single, stabilized payload.

BRIEF DESCRIPTION OF THE DRAWINGS

FIG. 6 is also the view along section line 6—6 in FIG. 7.

DETAILED DISCUSSION

Figure 1:
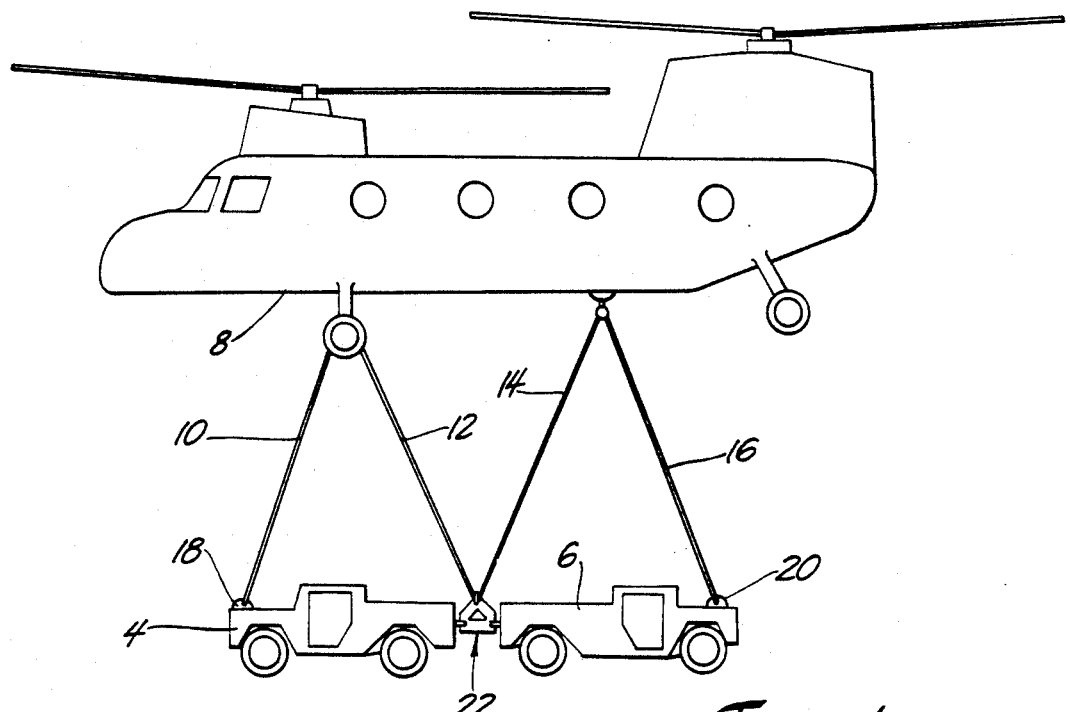
FIG. 1 is a side elevational view of a cargo helicopter air lifting two HMMWVs with my air lift rig.

Shown in FIG. 1 is a CH47 helicopter 8 having vehicles 4 and 6 suspended therefrom while the helicopter is in flight, the vehicles typically being US Army Highly Mobile Multipurpose Vehicles (HMMVs). Vehicles 4 and 6 are attached to helicopter 8 by a plurality of paired cables or chains, only the cables at 10, 12, 14 and 16 being visible in FIG. 1. The lower ends of the cables are attached to eyes 18 and 20 and to air lift rig 22. Rig 22 is fixed between vehicles 4 and 6 during flight, whereby the vehicles are immobilized relative to one another, and the helicopter's aggregate payload is stabilized.

Figure 2:
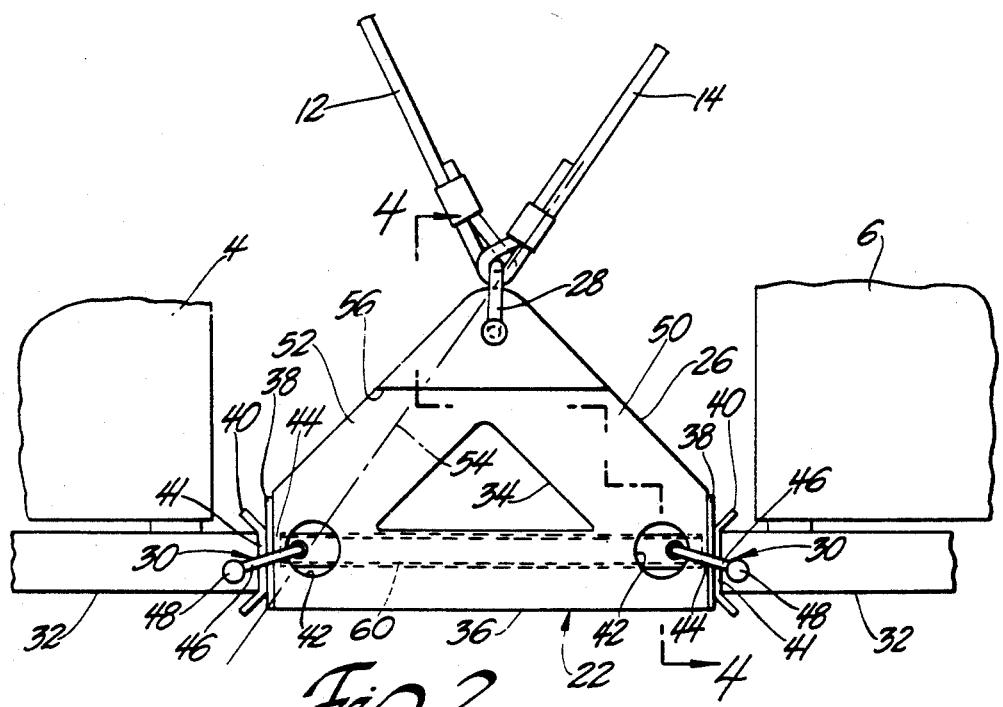
FIG. 2 is a detail view of the air lift rig shown in FIG. 1.
Figure 3:
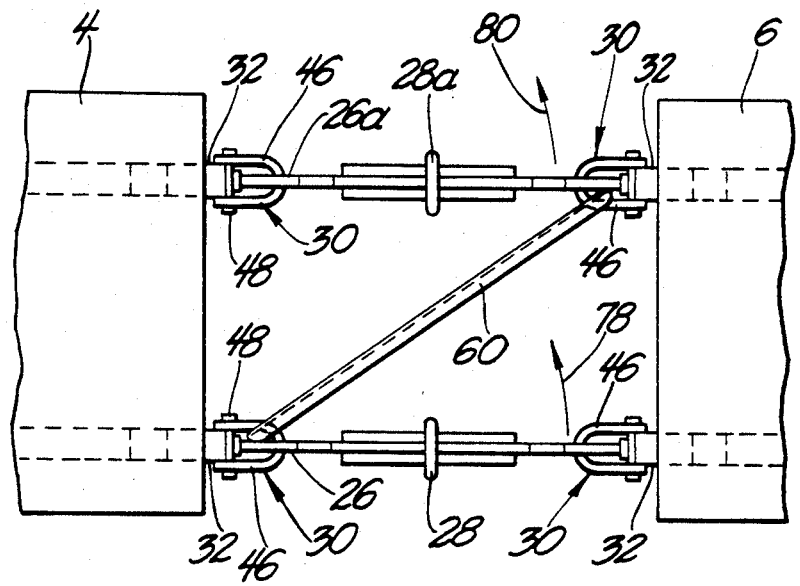
FIG. 3 is a plan elevational view of the rig, the cables being omitted for the sake of clarity.
Figure 4:
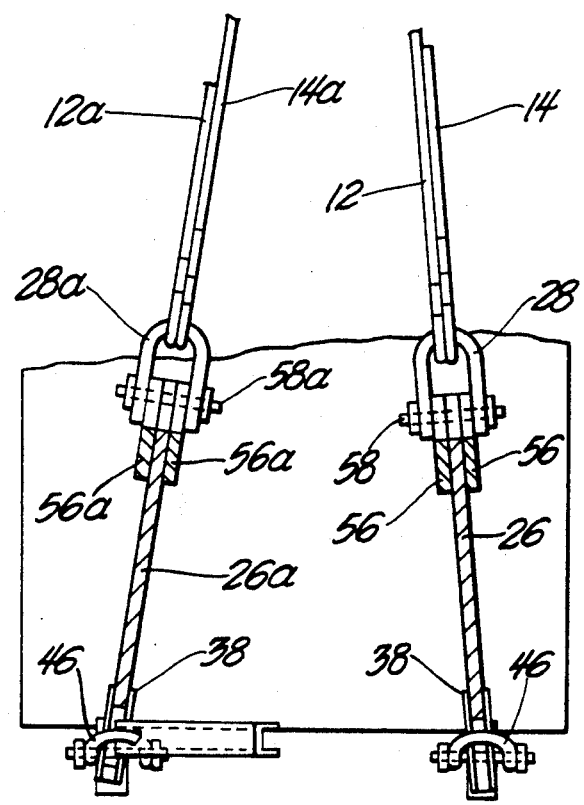
FIG. 4 is a sectional view taken along line 4—4 in FIG. 2.

As seen in FIGS. 2, 3 and 4, rig 22 has fish plates 26 and 26a (FIG. 4) connected by clevises 28 and 28a to cables 12, 14 12a and 14a. Clevises 30 connect fish plates 26 and 26a to frame extensions 32 of vehicles 4 and 6, the frame extensions being fixed to the chassis or frame (not shown) of the respective vehicles. The fish plates are flat, generally triangular structures, typically cut from mild steel plates and typically having triangular openings 34 in the middle for the purpose of weight reduction. Perpendicular to base 36 of the fish plate are edge plates 38 which abut and parallel a bearing face comprised of the mid section 41 of flanged end cap 40, which is affixed to the terminus of frame extension 32. Between each edge plate 38 and triangular opening 34 is a circular aperture 42. Aperture 42 and edge plate 38 border isthmus zone 44 having its narrowest portion where aperture 42 is closest to edge plate 38, the isthmus zone diverging or widening from the narrowest portion in either the upward or downward direction.

Passing through round aperture 42 is U-member 46 of clevis 30, the U-member pivoting about the axis of pin assembly 48, which is rotatably mounted to frame extension 32. Pin assembly 48 can be a conventional pin (not shown) having a head at on end and a threadingly engaged nut at the other end and a means such as a cotter pin to lock the nut to the pin. During air lift, the cables pull the fish plates upward so that the fish plates exert an upward force on U-members 46 and vehicles 4 and 6 lower relative to the fish plates, whereby the U-member tends to pivot upward about the axis of pin assembly 48. The tendency of U-members 46 to pivot upward forces frame extensions 32 to remain abutted with edge plates 38 of fish plates 26 and 26a, whereby the vehicles can not move toward or away from each other.

Figure 5:
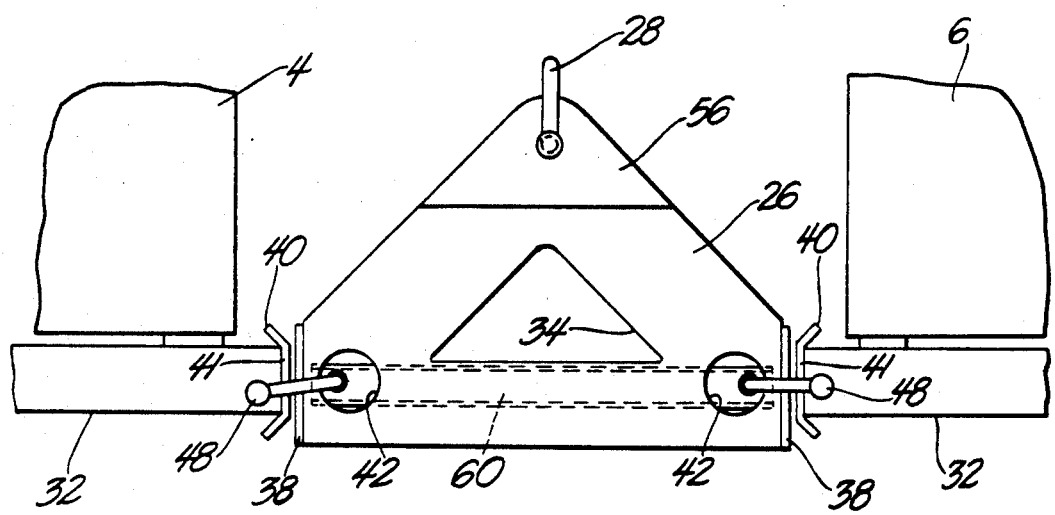
FIG. 5 is a detail view of the air lift rig when the rig is free from tension by the cables.

When helicopter 8 lowers vehicles 4 and 6 to the ground and cables 12, 12a, 14 and 14a go slack, fish plates 26 and 26a can lower relative to the vehicles and the vehicles can be nudged away from the fishplate until looseness exists in the connection between the fish plates and the vehicles. This looseness, shown by FIG. 5, facilitates the manual removal of the rig 22 from the vehicles. Of course, installation of rig 22 on the vehicles is also facilitated because vehicles need only be placed approximately in the correct position in order for the installation to occur. The loose fits between the fish plates, vehicles and clevises 30 compensate for error in positioning the vehicles for a helicopter lift. Once air lift begins, the rig and vehicles will again assume the FIG. 2 position during which looseness or slack is taken up.

Also during the FIG. 2 position, legs 50 and 52 of triangular fish plate 26 will be juxtaposed with the cables such that extensions of the axes of the cables will pass lengthwise through or along the legs. For example, extension 54 of the axis of cable 14 passes lengthwise along leg 52 at the surface thereof. As can be seen in FIG. 4, plate 26 and plate 26a tilt toward each other so that plate 26 is parallel to both cables 12 and 14, and so that plate 26a is parallel to both cables 12a and 14a. The juxtaposition of the fish plates and cables causes cable tension to result essentially only in tension loads along legs of the fish plates. The cables cause little or no upward torque or bending moment on the fish plates, thus allowing the fish plates to be relatively thin for the overall size of the plates. For example, the fish plate can be made from a mild steel sheet one-half an inch thick, the fish plate having a base-to-apex dimension of 16 inches, a base width of 24 inches and approximately a 6 inch dimension from straight sides of aperture 42 to the outer periphery of the plate.

At the curved apexes of the fish plates 26 and 26a respectively are reinforcing plates 56 and 56a, which typically are welded on opposite sides of the fish plates. The tops of the reinforcing plate are curved to conform to the curvature of the apexes and form a smooth surface therewith. Bolted clevis pins 58 and 58a retain clevises 28 and 28a on respective fish plates 26 and 26a, the pins passing through the reinforcing plates as well as the fish plates. The clevis pins fit closely but rotatably with the fish plates and reinforcing plates. The opening between the arms of each clevis 28 and 28a is equal to the combined width of the fish plate apex and the two reinforcing plates sandwiching the apex, whereby the motion of clevises 28 and 28a relative to the fish plates is limited to pivoting about the axes of pins 58 and 58a. Torque created by oppositely acting horizontal tension components on paired cables 12 and 14 and is transferred to fish plate 26 not only through pin 58 but also through the arms of clevis 28. Further, any inboard or counterclockwise torque in a vertical plane in FIG. 4 would similarly be transferred to fish plate 26 by both pin 58 and the arms of clevis 28. Similarly, torques from cables 12a and 14a would be transferred to fish plate 26a by both pin 56a and the arms of clevis 28a.

Figures 6, 7:
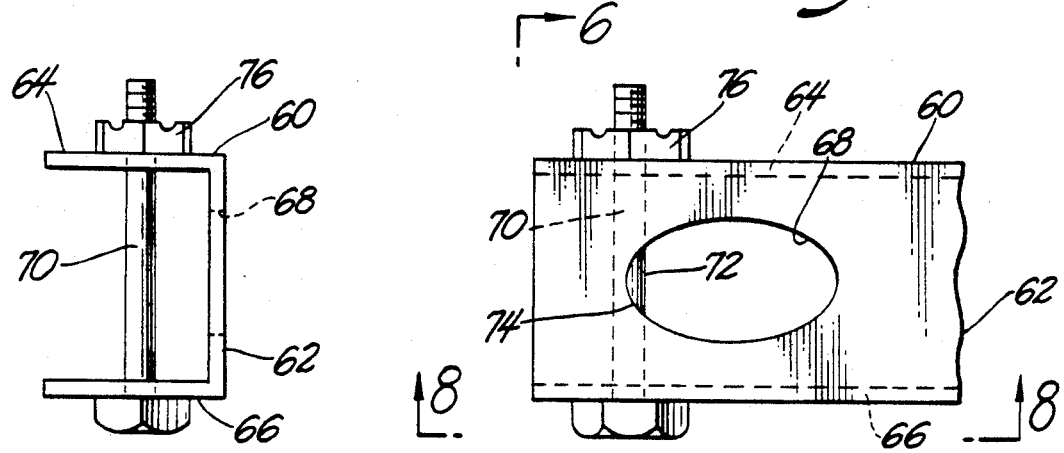
FIG. 6 is an end elevational detail view of one end of a portion of the cross member of the rig.
FIG. 7 is a side elevational detail view of the one end of the cross member of the rig.
Figure 8:
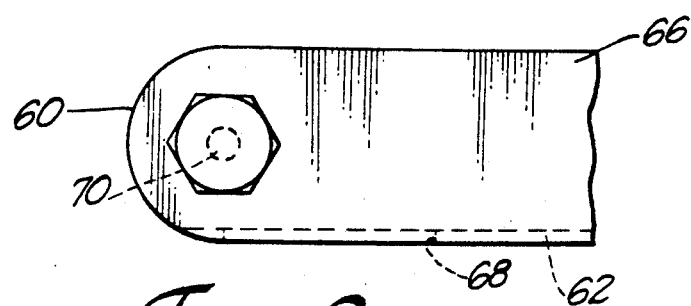
FIG. 8 is a view taken along line 8—8 in FIG. 7 and is also the bottom elevational view of the one end of the cross member.

As perhaps best seen in FIG. 3, rig 22 includes a diagonal cross member 60 between clevis 30 on vehicle 4 and clevis 30 on vehicle 6, the purpose of cross member 60 being to limit relative lateral movement between the vehicles. Detail views of one end of cross member 60 are shown in FIGS. 6, 7 and 8 wherein the cross member is a channel having web 62 and flanges 64 and 66. Web 62 defines an oval aperture 68 whose minor diameter is greater than the cross-sectional diameter of U-shaped portion 45 of clevis 30 so that it is possible for clevis 30 to fit loosely through aperture 68. A bolt 70 extends through flanges 64 and 66 so that there is an overlap relative to the longitudinal axis of cross member 60 between bolt 70 and aperture 68. The overlap is designated as reference numeral 72 in FIG. 8. When the U-shaped portion of clevis 30 bears or slides against the zone 74 of aperture 68, bolt 72 will receive at least some of the bearing or sliding force and thereby protect zone 74. A castle nut 76 threadingly affixes bolt 70 to cross member 60. It is possible for a cotter pin (not shown) to pass through crenelations of the castle nut and pass diametrically through the shank of the bolt, whereby the castle nut and bolt are locked in the position shown in FIGS. 6, 7 and 8.

As best seen in FIG. 3, when clevises 30 rotate upward as the cables pull on the fish plates, the clevis 30 at one end of cross member 60 will pivot clockwise and the clevis 30 at the other end will pivot counterclockwise, thereby creating a tendency for the clevises to twist cross member 60. However, web 62 of cross member 60 is relatively thin so that clevises 30 can tilt to a maximum degree without binding on the sides of aperture 68, whose minor diameter, as noted before, is greater than the cross-sectional diameter of U-shaped portion 46. Also, as seen in FIG. 8, the ends of the cross member are rounded to avoid binding between the cross members and the fish plates. The lack of binding insures that cross member 60 will not interfere with pivoting of clevis 30 when the cables begin pulling upward on rig 30. 30. The slight looseness of fit between cross member 60 and clevises 30 in the FIG. 2 position allows only a very limited amount of relative lateral movement between vehicle 4 and 6. It has been determined by actual use of rig 22 that such very limited lateral movement is acceptable.

It has been previously noted that the horizontal components of tension on cables 12 and 14 creates a torque that is transferred to fish plate 26. Because of the torque, fish plate 26 is biased to rotate counterclockwise, in the direction of arrow 78 in FIG. 3. Likewise the horizontal components of tension on cables 12a and 14a create a torque that is transferred to fish plate 26a, whereby fish plate 26a is biased to rotate counterclockwise, in the direction of arrow 80 in FIG. 3. It may be preferred that the fish plates both have a bias in the same angular direction, either counterclockwise as shown in FIG. 3 or else clockwise. This bias will rotate the plates until any slack between clevises 30 and cross member 60 is taken up, whereby the limited relative lateral movement between vehicles 4 and 6 is either further reduced or eliminated entirely. The bias of the fish plates in the same angular direction can be accomplished by having forward extending cable 12a attached to clevis 28a outward or outboard of rearward extending cable 14a, while forward extending cable 12 is attached to clevis 28 inward or inboard of rearward cable 14. Such an arrangement is shown in FIG. 4.

I wish it to be understood that I do not desire to be limited to the exact details of construction shown and described herein since obvious modifications will occur to those skilled in the relevant arts without departing from the spirit and scope of the following claims.

I claim:

1. A rig for joining two payload items suspendable from an aircraft, the rig comprising:

two rig plates faced toward one another;

the rig plates defining engagement apertures and defining isthmus zones between the engagement apertures and opposed ends of the rig plates the isthmus zones each having a neck from which the isthmus zones diverge;

swingable means disposed at each of the opposed ends for connecting the rig plates to the payload items, the swingable means having movable members pivotably connected to the payload items;

wherein intermediate segments of the movable members travel along diverging portions of the isthmus zones as the rig plates rise, thereby drawing the payload items into contact with the opposed ends of the rig plates.

2. The rig of claim 1 wherein:

the swingable means includes a load clevis swingable about a swing axis in one payload item;

the one payload item has a load bearing surface disposed between the swing axis and an abutment surface on one of the opposed ends of each of the rig plates; and the load bearing surface is drawn into face-to-face contact with one of the abutment surfaces when the rig plates are pulled.

3. The rig of claim 1 wherein each rig plate has:

a generally triangular apex;

two reinforcement plates sandwiching the apex therebetween;

a generally U-shaped segment pivotable about an axis passing through the apex and the reinforcement plates, the generally U-shaped segment having parallel legs closely and slidably straddling a sandwich formed by the apex and reinforcing plates.

4. The rig of claim 3 including a pair of cables connected between the U-shaped segment and the aircraft, at least one of the cables when tensioned having a cable axis passing through a first point at the sandwich and passing through a second point at the abutment surface.

5. An air lift rig for joining together two payload items suspendable from an aircraft, comprising:

upwardly pivotable load clevises mounted on the payload items;

two generally triangular plates, each triangular plate having a base, an apex and two legs extended from the base and joined at the apex;

abutment surfaces at opposite ends of the bases, one abutment surface faced toward one payload item, another abutment surface faced toward another payload item;

the triangular plates defining clevis engagement apertures at the ends of the bases and defining isthmus zones between the engagement apertures and the ends of the bases, the isthmus zones each having a narrowest width from which the isthmus zones diverge;

U-shaped portions of the load clevises passing through the clevis engagement apertures;

an apex clevis pivotally mounted at each of the apexes;

a pair of cables connected between each apex clevis and the helicopter;

a cross member connected to a first one of the load clevises, the cross member also connected to a second one of the load clevises, the cross member disposed diagonally with respect to the bases of the triangular plates.

6. The air lift rig of claim 5 further wherein:

one of the cables attached to each apex clevis is a forwardly extending cable and another of the cables attached to each apex clevis is a rearwardly extending cable, whereby horizontal components of the cables under tension exert a turning bias on the triangular plates;

the forwardly extending cable on one apex clevis is inboard of the rearwardly extending cable on the one apex clevis;

the rearwardly extending cable on another apex clevis is inboard of the forwardly extending cable on the other apex clevis;

whereby the triangular plates are biased in essentially the same angular direction so as to inhibit slack in connections of the cross member with the load clevises.

7. The rig of claim 5 wherein the cross member comprises;

a channel having a web and flanges integral with the web;

the web defining elliptical holes at either end of the cross member, a minor axis of the elliptical holes being larger than a cross section of a part of the U-shaped portion passing through the one of the elliptical holes, major axes of the elliptical holes being oriented lengthwise with respect to the cross member.

8. The rig of claim 7 including a shanked member connected between the flanges, a portion of the shanked member being equidistant from one end of the cross member with an elliptical hole peripheral segment nearest the one end.

9. The rig of claim 5 wherein the cables are tensionable, one of the cables when tensioned having an axis aligned with a line passing through a first point at one end of one leg and passing through a second point at another end of the one leg.

10. An air lift rig for joining together two vehicles suspendable from a helicopter, comprising:

upwardly pivotable load clevises mounted on the vehicles:

two generally triangular plates, each triangular plate having a base, an apex and two legs extended from the base and joined at the apex;

abutment plates at opposite ends of the bases, one abutment plate faced toward a bearing face on one vehicle, another abutment plate faced toward a bearing face on another vehicle;

the triangular plates defining clevis engagement apertures at the opposite ends and defining isthmus zones between the engagement apertures and the ends, the isthmus zones each having a narrowest width from which the isthmus zones downwardly diverge;

portions of the load clevises passing through the clevis engagement apertures;

an apex clevis pivotally mounted at each of the apexes;

a pair of cables connected between each of the apex clevises and the helicopter, the axis of a tensioned cable passing through a first point at one end of the one leg and passing through a second point at another end of the one leg;

a cross member connected to a first one of the load clevises, the cross member also connected to a second one of the load clevises, the cross member disposed diagonally with respect to the bases of the triangular plates;

the triangular plates loosely connected to the vehicles when the cables are not under tension but are tightly connected to the vehicles when the cables are under tension.

* * * * *